Feb. 9, 1932.  L. SCHNEIDER ET AL  1,844,691
VEGETABLE WASHER AND CLEANER
Filed June 20, 1930
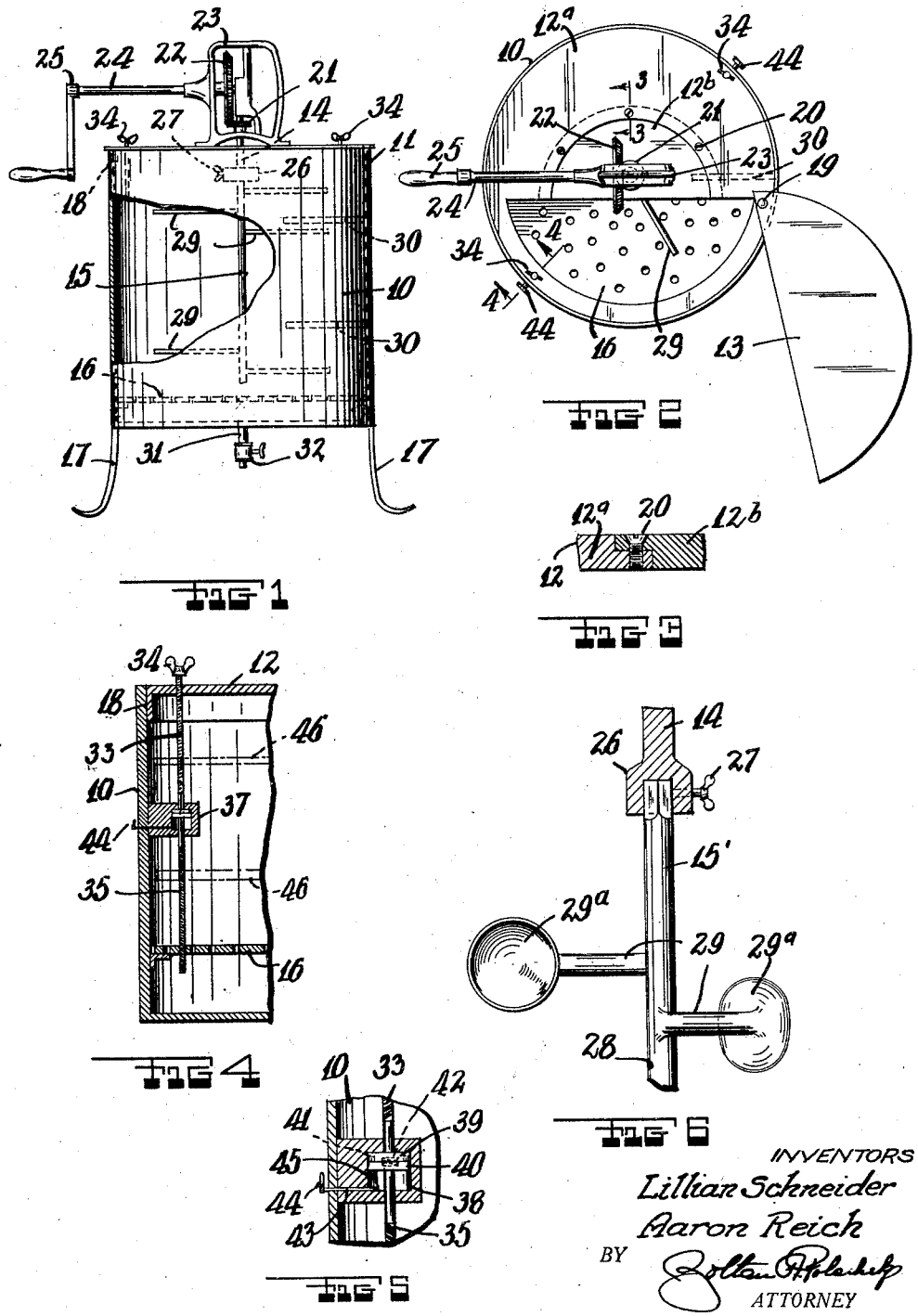
INVENTORS
Lillian Schneider
Aaron Reich
BY
ATTORNEY Patented Feb. 9, 1932

1,844,691

UNITED STATES PATENT OFFICE

LILLIAN SCHNEIDER AND AARON REICH, OF BROOKLYN, NEW YORK

VEGETABLE WASHER AND CLEANER

Application filed June 20, 1930. Serial No. 462,470.

This invention relates to new and useful improvements in a vegetable washer and cleaner.

The invention has for an object the provision of a device of the class mentioned which is of simple durable construction, dependable in use and efficient in action, and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a side elevational view of a device constructed according to this invention.

Fig. 2 is a plan view of Fig. 1 shown with the movable section of the cover open.

Fig. 3 is an enlarged fragmentary sectional view taken on the line 3—3 of Fig. 2.

Fig. 4 is a fragmentary sectional view taken on the line 4—4 of Fig. 2.

Fig. 5 is an enlarged detailed view of a portion of Fig. 4.

Fig. 6 is a fragmentary view of a modified form of agitator for the device.

The vegetable washer and cleaner comprises a container 10 for holding vegetables and water and open at the top 11, a cover 12 closing said container and formed with a movable section 13 for the insertion of vegetables within said container, a stud shaft 14 rotatively mounted thru said cover 12, means for rotating said stud shaft, an agitator 15 detachably mounted on said stud shaft 14, a screen 16 transversely supported across said container 11 near its bottom, and means for draining water from said container 10.

The container 10 is of cylindrical form and supported by several feet 17. The cover 12 is of flat form and provided with downturned edges 18 engaging within the container 10. The movable section 13 of the cover is connected with the remaining portion of the cover by a universal joint 19. This allows the movable section 13 to be moved laterally or up and down. The stationary part of the cover 12 is formed of two portions indicated by reference numerals 12$^a$ and 12$^b$ respectively. These portions have overlapping edges, and screws 20 serve to detachably connect these parts.

The means for rotating said stud shaft 14 consists of a bevel gear 21 attached upon the top end of the stud shaft and meshing with a bevel gear 22 rotatively supported upon a bracket 23 attached upon the section 12$^b$ of the cover 12. The rotative supporting of the bevel gear 22 is accomplished by a spindle 24 which is provided with a handle 25 at its outer end for manual turning. The lower end of the stud shaft 14 terminates in a socket 26 and the top end of the agitator 15 engages in this socket. A set screw 27 serves to clamp the agitator in place in the socket. The agitator shown in Fig. 1 consists of a vertical central member 28 and a plurality of horizontal fingers 29. These fingers straddle other fingers 30 stationarily mounted upon the inner face of the container 10.

The screen 16 comprises a perforated sheet of metal or other stiff material. The means for draining water from the container 10 consists of a pipe 31 engaged thru the bottom of the container and provided with a control valve 32. In Fig. 6 a modified form of agitator 15' has been illustrated which is provided with a central member 28 and fingers 29 terminating in cups 29$^a$. This type of agitator is very efficient in cleaning beans or other small foods. The type shown in Fig. 1 is very efficient for cleaning spinach.

A means is also provided for changing the distance between the cover 12 and the screen 16 for changing the operative size of the container. This means comprises screws 33 rotatively supported within said container 10 and threadedly engaging said cover 12 and having their top ends extended and provided with heads 34, other screws 35 of opposite hand threads rotatively supported in line with said screws 33 and threadedly engaging said screen 16, and means for coupling and uncoupling said screws 33 and 35 for moving the cover and screen simultaneously or moving the cover individually.

As shown on the drawings, there are two screws 33 in all, diametrically opposite each other. The wing heads 34 are disposed on the outside of the cover 12 so as to be readily manually operable. The means for coupling and uncoupling the screws 33 and 35 consists of a bracket 37 for each pair of aligned screws and supported within the container 10. This bracket is formed with a hollow portion 38 receiving heads 39 and 40 from the screws 33 and 35 respectively. Pegs 41 project from one of these heads and engage in apertures in the other of the heads so that when the heads are in contact with each other, the screws are coupled. An expansion spring 42 is arranged between the heads 39 and 40 and normally tends to separate these parts. A spindle 43 is rotatively engaged thru the bracket 37 and extends to the outer side of the container 10. A handle 44 is fixed upon the free extended end of the spindle. A cam 45 is fixed upon the inner end of the spindle 43 and in one position is adapted to hold the head 40 in engagement with the head 39, and in another position allow the spring 42 to separate the heads.

In operation of the device, the cover 13 is opened and spinach or other vegetables placed within the container. Then water is added and the cover closed. Next the handle 25 is rotated for causing the agitator 15 to operate and thoroughly clean the contents of the container. The screen 16 holds the vegetables spaced from the bottom of the container so as not to cause the discharge pipe 31 to be blocked. After the vegetables have been cleaned, they may be removed thru the opening in the cover 12 and the water drained out of the container by opening the valve 32.

For different types of vegetables different types of agitators are more efficient. For this reason the screws 20 may be removed for loosening the section 12$^b$ so that the agitator may be removed from the container and replaced by another one. It is merely necessary to loosen the screw 27 so that the agitator may be disconnected from the stud shaft 14 for accomplishing the replacing.

Upon a change of the agitator and a change of the vegetables to be cleaned, it may be very desirable to change the operative capacity of the container. This may be accomplished by turning the handle 44 so that the cam 45 causes the heads 40 and 39 to engage each other and then simultaneously turning the wing heads 34 for rotating the screws in one direction or the other to cause the cover 12 and the screen 16 to simultaneously move together or apart. Dot and dash lines 46 in Fig. 4 indicate another position of the cover and screen. If the position of the screen 16 is satisfactory and it is merely necessary to change the position of the cover 12, the handles 44 may be turned so that the springs 42 separate the heads 39 and 40. Then the wing heads 34 may be turned for merely rotating the screws 33 and moving the cover 12 only.

While we have shown and described the preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by United States Letters Patent is:—

1. A vegetable washer and cleaner, comprising a container for holding vegetables and water and opened at the top, a cover closing said container and formed with a movable section for the insertion of vegetables within said container, a stud shaft rotatively mounted thru said cover, means for rotating said stud shaft, an agitator detachably mounted on said stud shaft, a screen transversely supported across said container near its bottom, means for draining water from said container, and means for changing the distance between said cover and screen for changing the operative size of said container, comprising screws rotatively supported within said container and threadedly engaging said cover and having their top ends extended, screws of opposite hand threads rotatively supported in line with said screws and threadedly engaging said screen, and means for coupling and uncoupling said screws for moving the cover and screen simultaneously or moving the cover individually.

2. A vegetable washer and cleaner, comprising a container for holding vegetables and water and opened at the top, a cover closing said container and formed with a movable section for the insertion of vegetables within said container, a stud shaft rotatively mounted thru said cover, means for rotating said stud shaft, an agitator detachably mounted on said stud shaft, a screen transversely supported across said container near its bottom, means for draining water from said container, and means for changing the distance between said cover and screen for changing the operative size of said container, comprising screws rotatively supported within said container and threadedly engaging said cover and having their top ends extended, screws of opposite hand threads rotatively supported in line with said screws and threadedly engaging said screen and means for coupling and uncoupling said screws for moving the cover and screen simultaneously or moving the cover individually, comprising a bracket formed with a hollow portion and for supporting said aligned screws, heads at the end of said screws within the hollow of said bracket, means for engaging said heads, and means for preventing the heads from slipping when in an engaged position.

3. A vegetable washer and cleaner, comprising a container for holding vegetables and water and opened at the top, a cover closing said container and formed with a movable section for the insertion of vegetables within said container, a stud shaft rotatively mounted thru said cover, means for rotating said stud shaft, an agitator detachably mounted on said stud shaft, a screen transversely supported across said container near its bottom, means for draining water from said container, and means for changing the distance between said cover and screen for changing the operative size of said container, comprising screws rotatively supported within said container and threadedly engaging said cover and having their top ends extended, screws of opposite hand threads rotatively supported in line with said screws and threadedly engaging said screen, and means for coupling and uncoupling said screws for moving the cover and screen simultaneously or moving the cover individually, comprising a bracket formed with a hollow portion and for supporting said aligned screws, heads at the end of said screws within the hollow of said bracket, means for engaging said heads, and means for preventing the heads from slipping when in an engaged position, said means for engaging the heads comprising a spindle rotatively engaged through the bracket, a cam fixed upon the inner end of said spindle, and a handle fixed upon the outer end of the spindle.

4. A vegetable washer and cleaner, comprising a container for holding vegetables and water and opened at the top, a cover closing said container and formed with a movable section for the insertion of vegetables within said container, a stud shaft rotatively mounted thru said cover, means for rotating said stud shaft, an agitator detachably mounted on said stud shaft, a screen transversely supported across said container near its bottom, means for draining water from said container, and means for changing the distance between said cover and screen for changing the operative size of said container, comprising screws rotatively supported within said container and threadedly engaging said cover and having their top ends extended, screws of opposite hand threads rotatively supported in line with said screws and threadedly engaging said screen, and means for coupling and uncoupling said screws for moving the cover and screen simultaneously or moving the cover individually, comprising a bracket formed with a hollow portion and for supporting said aligned screws, heads at the end of said screws within the hollow of said bracket, means for engaging said heads, and means for preventing the heads from slipping when in an engaged position, comprising pegs projecting from one head and engageable in apertures formed in the other head.

In testimony whereof we have affixed our signatures.

LILLIAN SCHNEIDER.
AARON REICH.